United States Patent [19]

Neukermans et al.

[11] 4,101,781
[45] Jul. 18, 1978

[54] STABLE FIBER OPTIC SCINTILLATIVE X-RAY SCREEN AND METHOD OF PRODUCTION

[75] Inventors: Armand Paul Neukermans, Palo Alto; William Paul Kruger, Los Altos Hills, both of Calif.

[73] Assignee: Hewlett-Packard Company, Palo Alto, Calif.

[21] Appl. No.: 806,966

[22] Filed: Jun. 27, 1977

[51] Int. Cl.² ............................................. G01J 1/58
[52] U.S. Cl. .................................. 250/483; 250/486; 252/301.4 R; 252/301.4 H
[58] Field of Search ............................ 250/483, 486; 252/301.4 R, 301.4 H

[56] References Cited
U.S. PATENT DOCUMENTS

| | | | |
|---|---|---|---|
| 2,272,375 | 2/1942 | Kallmann et al. | 250/483 |
| 3,829,700 | 8/1974 | Buchanan | 250/483 |
| 3,872,309 | 3/1975 | DeBelder et al. | 252/301.4 H |
| 4,039,840 | 8/1977 | Shimiya et al. | 250/483 |
| 4,070,583 | 1/1978 | Rabatin | 250/483 |

*Primary Examiner*—Harold A. Dixon
*Attorney, Agent, or Firm*—Robert S. Hulse

[57] ABSTRACT

An X-ray intensifying screen pair comprising a thin screen and a fiber optic thick screen is disclosed, together with a method for producing the fiber optic thick screen, which method includes the steps of evaporation and vacuum deposition. The thin screen comprises a gadolinium oxysulphide rare earth scintillator capable of providing good image resolution, and the fiber optic thick screen comprises a thallium doped cesium iodide scintillator that is capable of high speed (i.e., good X-ray photon-stopping and photon-conversion) operation, that is stable under ambient conditions, and that requires low patient dosage.

16 Claims, 9 Drawing Figures

FIBER (NEEDLE) GROWTH

TOP VIEW MOSAIC ARRAY

STABLE FIBER OPTIC SCINTILLATIVE X-RAY SCREEN AND METHOD OF PRODUCTION

BACKGROUND OF THE INVENTION

The quality of radiologic (X-ray) images and the extent of patient exposure to X-radiation depend to a significant degree upon X-ray dosage, i.e., the number of X-ray photons per unit area that are applied to the patient or object under investigation. Generally, the greater the applied dosage, the greater the amount of information produced in the resulting X-ray image, and hence, the better the quality of the image. From a practical standpoint, however, the intensity of the X-ray dosage used in radiological procedures is limited by the undesirability of exposing the patient to too great an amount of radiation. This limitation in many instances causes, indirectly, the production of images of less than desired quality.

Generally, to produce an image on film, the X-ray film is placed between scintillative or intensifying screens, e.g., screens having inorganic crystalline phosphors embedded therein. The screens act to stop and absorb the X-rays, and to convert them to visible light. The screens also act to transfer the visible light (i.e., allow the visible light to escape) to the X-ray film. When an X-ray photon which has interacted with matter under investigation strikes a phosphor in the screen and is absorbed by the phosphor, the phosphor scintillates and gives off visible quanta of light. Some of this light escapes from the screen and strikes the film, thereby exposing the film at the point of incidence and producing an optical image thereon.

Conventional X-ray intensifying screens, as shown, for example, in FIGS. 1A and 1B, are generally used in pairs, one screen above the film, and one screen below the film, sandwiching the film. Such paired usage prevents, to a significant extent, lateral diffusion of the visible light photons and consequent loss of resolution of the optical image. A screen may be thin (about 125 $\mu$m in thickness), or thick (about 200 $\mu$m in thickness). A thick screen typically has a large quantity of phosphors interposable in the path of the X-ray photons and provides substantial X-ray photon-stopping absorption and conversion power. Thin screens, on the other hand, typically have a smaller quantity of phosphor particles that are interposable in the path of X-ray photons than do thick screens, thereby causing less diffusion (scatter) of light photons than do thick screens (and, hence, providing better image resolution or detail). However, thin screens have lower "speed" capabilities, i.e., poor photon stopping, or absorption capabilities than do thick screens, and requires greater patient exposure or dosage than thick screens. Thick screens typically have high speed capabilities, i.e., good photon-stopping and absorption capabilities (hence, provides less dosage to the patient) but poorer image resolution. When an image with good resolution is desired, therefore, a pair of thin image intensifying screens such as shown in FIG. 1A is generally used to produce the image. When a lesser-dosage, higher-speed image is desired, i.e., an image where a large percentage of the applied X-ray photons are utilized (stopped, absorbed, converted to visible light, and allowed to escape to expose the film), a pair of thick screens such as shown in FIG. 1B is used. To produce an image using thick screens, therefore, less radiation and hence, less dosage to the patient is required than for thin screens, but a greater amount of diffusion occurs, resulting in images of poorer resolution.

Typically, each screen of the pair, whether thin or thick, is constructed of the same phosphor or scintillator substance and have the same thickness. Generally, this phosphor substance is particulate in form, and is sprayed onto a backing material to form the screen. Another phosphor or scintillator material, sodium doped cesium iodide, CsI(Na), is growable in pillar (bulk) form or in needle (fiber) form, but is unstable (i.e., it decays, and its scintillative properties become degraded) when used under ambient conditions (i.e., at a temperature of about 20-25 degrees centigrade, and at a relative humidity of about 75%). The fact that one scintillator material (e.g., sodium doped cesium iodide crystals) is growable in needle form, does not suggest or otherwise make it obvious that another scintillator material (e.g., thallium doped cesium iodide crystals) is also growable in needle form. Also, because CsI(Tl) crystals are growable in pillar form does not suggest or otherwise make it obvious that said crystals are also growable in needle form. Actually, the addition of a substance to a compound, in certain concentrations, may cause no crystal growth, or cause a reversion from needle growth to another type of growth such as malformed dendritic growth as described, for example, on page 138 of the article by B. J. Mason entitled "Ice", appearing in *The Art and Science of Growing Crystals*, edited by J. J. Gilman and published by John Wiley and Sons, Inc., New York, 1963. Furthermore, even if crystal growth in needle form is achieved for a scintillator material, there is no guarantee that such a material will be stable at ambient conditions as indicated above by the instability of CsI(Na).

What is needed, therefore, is a novel screen pair which includes scintillator material that is stable and does not decay under ambient conditions, and which provides substantially as good an image resolution as thin screens, and has substantially as high a speed capability and requires substantially as little dosage as thick screens. What is also needed is a method of producing the novel screen pair.

SUMMARY OF THE INVENTION

Thus, in accordance with the illustrated preferred embodiment of the present invention, an X-ray intensifying screen pair is provided comprising a thin screen and a fiber optic thick screen which, together, are capable of producing good quality images and requiring low patient dosage. The thin screen comprises a gadolinium oxy-sulphide rare earth scintillator capable of providing good image resolution (e.g., up to 5 line pairs/mm), and the fiber optic thick screen comprises a thallium doped cesium iodide scintillator that is capable of high speed operation, and that is stable under ambient conditions. Also, a method is disclosed for producing the fiber optic scintillator, by evaporation and vacuum deposition.

DESCRIPTION OF THE PREFERRED EMBODIMENT

Figure 1A:
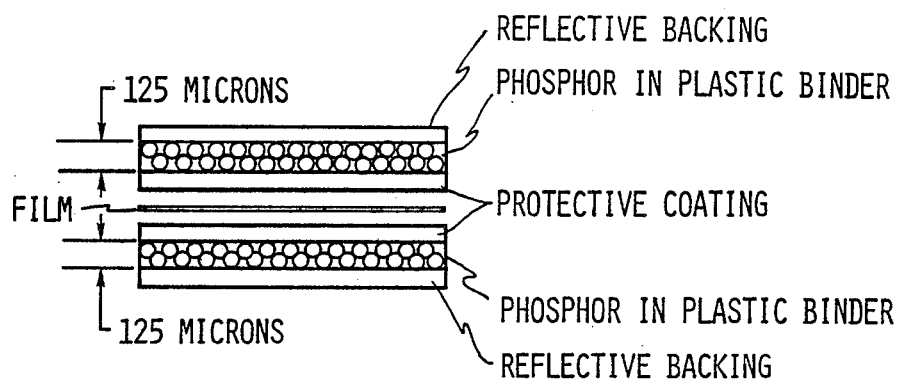
FIGS. 1A and 1B are sectional side views of thin and thick X-ray intensifying screens of the prior art.
Figure 1B:
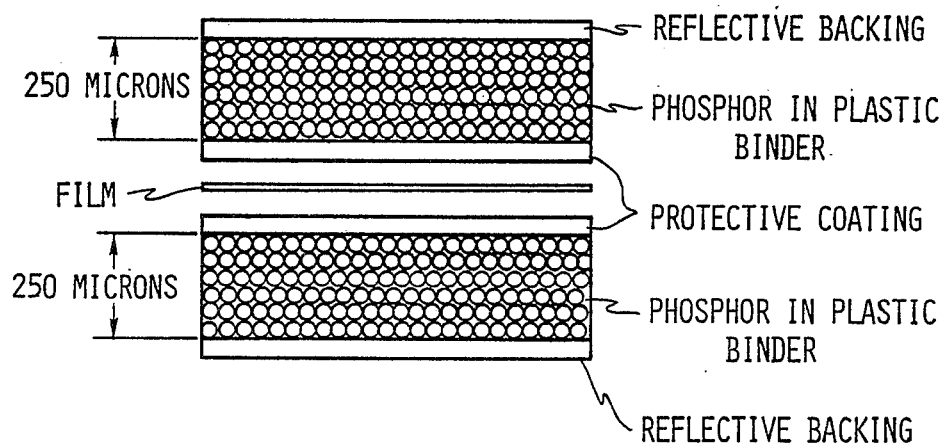
Figure 2:
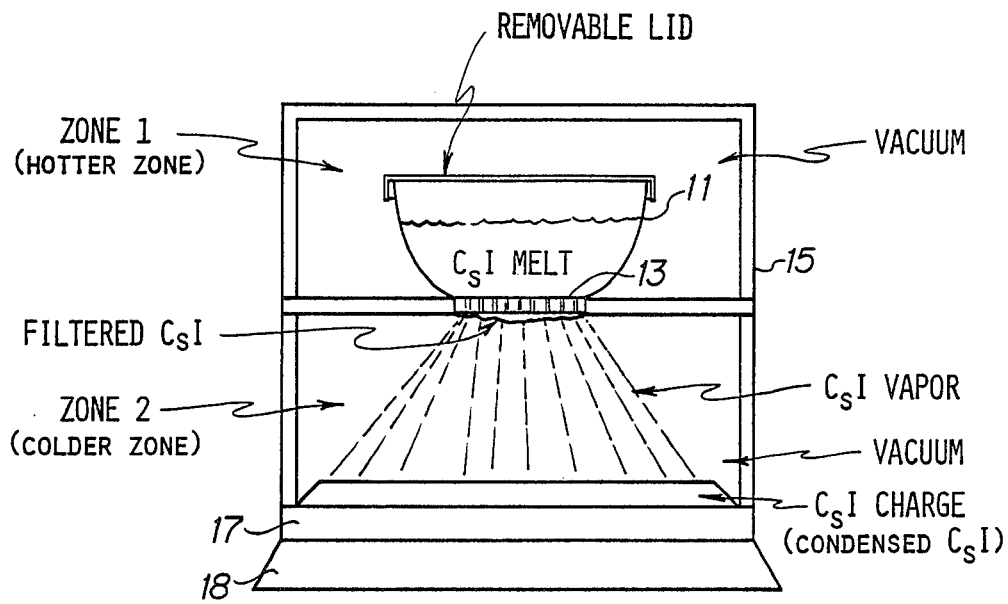
FIG. 2 is a sectional side view of a first oven used in accordance with the present inventive method to produce a cesium iodide charge.

Referring now to FIG. 2, there is shown a porcelain crucible 11 with a porous alumina (aluminum oxide frit) bottom 13, into which a selected quantity of CsI powder is loaded. (Generally, 150 grams of CsI powder is used to produce a 1.5mm thick scintillative coating on a 12cm × 18mm screen.) The crucible 11 containing the CsI powder is then placed into a top portion (zone) of an evacuated two-zone quartz oven 15. The evacuated oven is heated to a temperature of 500° C, causing it to outgas the CsI powder (i.e., to heat and dislodge absorbed gaseous impurities such as water vapor that may have adhered to the surface of the CsI powder, which impurities are then removed by the vacuum action in the oven), thereby preliminarily purifying the CsI powder. Oven 15, and consequently crucible 11, is then heated to a temperature of 650° C which raises the temperature of the purified CsI powder in the crucible to 621° C or above, and melts the CsI powder. The melted CsI then flows through (i.e., permeates or filters through) the porous bottom 13 and accumulates as a hot liquid on the outside of bottom 13. (The filtering action of porous bottom 13 serves to remove insoluble organic and inorganic impurities from the CsI). This hot filtered liquid then evaporates due to the vacuum in the lower and cooler zone of oven 15, and becomes CsI vapor (gas). The CsI vapor then condenses on quartz charge-support disc 17, which is maintained, by conduction through bottom plate 18, at a temperature significantly less (generally 100° C less) than other structures in oven 15. The condensed CsI vapor forms a thick (approximately 5mm), transparent deposit or "charge" on disc 17.

Figure 3:
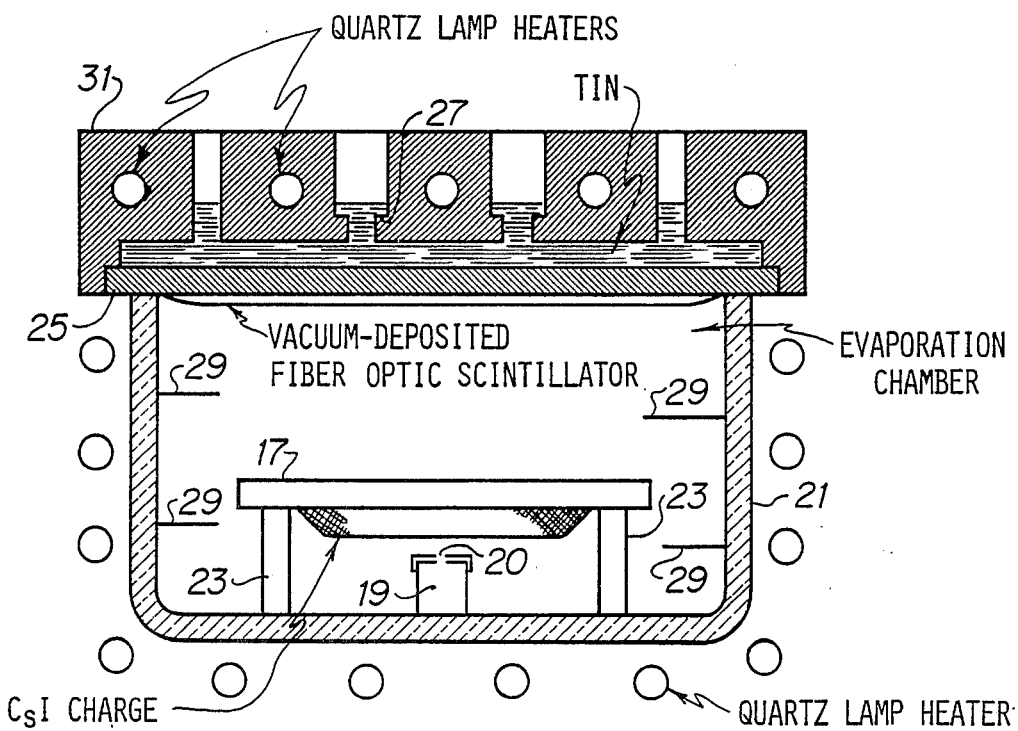
FIG. 3 is a sectional view of a second oven used in accordance with the present inventive method to produce a thallium doped cesium iodide scintillator.

The preceding operations represent, collectively, a first evaporation (vapor deposition) procedure. In a second evaporation procedure, as shown in FIG. 3, the disc 17 with the CsI charge, and a glass container 19 containing TlI powder, are placed in a quartz oven 21, the disc 17 being placed on rods 23 above the floor of the oven 21, with the CsI facing the floor of the oven, and the container 19 being placed on the floor of the oven 21 under disc 17. Except for having a small orifice 20, the glass container 19 is closed after the TlI powder is inserted. The quantity of the TlI in the container and the size of the orifice 20 is selected to produce, over a predetermined period of time, a desired doping concentration of TlI to CsI (e.g., 0.1 grams of TlI, and an orifice 1 mm² in diameter may be utilized for a period of 12 hours, to produce a doping concentration of 0.1 mole percent, i.e., 1 molecule of TlI to 1000 molecules of CsI). Oven 21 has an open portion over which a screen backing or support material 25 (e.g., pyroceram glass ceramic plates) is placed forming a closed chamber in the oven. A graphite heater block assembly 31 comprising quartz lamp heaters and a slab of tin about 5mm thick is kept in contact with the screen backing material 25 outside the oven 21 for producing a uniform distribution of temperature over the backing material 25. Ridges 27 serve to anchor the tin in the assembly 31. The graphite heater block assembly 31 also serves to keep the backing material 23 at a lower temperature than the temperatures of other materials and structures in the oven 21. Disc 17, which is supported by support rods 23, blocks all direct paths to backing material 25 from the TlI material in container 19 and from the CsI charge material on disc 17.

Oven 21 is then evacuated, and the oven and screen support 25 are heated to a temperature of approximately 200° C for a period of about 60 minutes, which outgasses the contents of the oven 21 and removes gas impurities from the surfaces of the screen support 25, the CsI charge and the TlI in container 19. Following this outgassing step, the temperature inside oven 21 is raised to approximately 575° C, and the temperature of assembly 31 is raised to approximately 300° C by the quartz lamp heaters. Due to the temperatures of both assembly 31 and oven 21, but primarily due to the temperature of assembly 31, the temperature of screen support 25 is also raised to approximately 300° C (i.e., 300° C being a selected temperature within the range 250° C to 375° C). Above 232° C, the tin melts and forms a bath of liquid tin in contact with screen support 25, serving to keep the temperature of screen support 25 uniform and close to the temperature of assembly 31. The surface of the screen support 25 thus becomes the coolest surface in the oven 21 (for purposes of condensation).

The oven temperature of approximately 575° C is selected so as to cause both the CsI charge and the TlI powder in container 19 to change from solid to gaseous phase and evaporate. At this oven temperature of approximately 575° C, the TlI gas is released or leaks at a predetermined rate from container 19, via orifice 20, and mixes in a predetermined ratio (e.g., 1 part of TlI to 1000 parts of CsI) with the evaporated CsI gas in the oven 21. Leak rate may be determined from the size of the orifice, the temperature and vapor pressure of the TlI.

Figure 4:
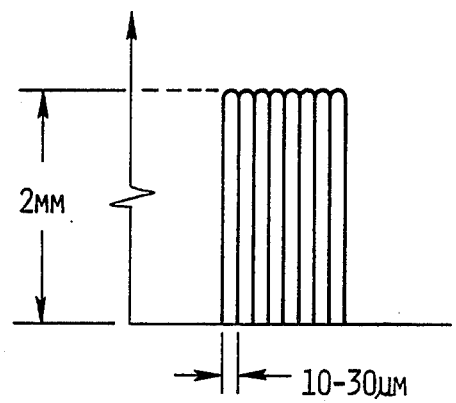
FIG. 4 is a graphic illustration of fibrous growth of the thallium doped cesium iodide scintillator produced in accordance with the present inventive method.

When the temperature of screen support 25 (i.e., the condensation temperature of the screen support's surface located in the oven) is maintained within the range 250° C to 375° C, approximately, the mixed TlI and CsI gasses condense on the surface of screen support 25 within the oven (the surface of screen support 25 being the coolest surface in the oven) to form thallium doped cesium iodide fibers or needles as shown in FIG. 4. By this evaporation-condensation procedure, needles as tall as 2mm, and from 10 to 30 μm in diameter have been grown, within an 8–12 hour time period. (For condensation temperatures less than 250° C approximately, poor quality, irregular diameter fibers are formed; for condensation temperatures greater than 375° C approximately, pillars rather than fibers are formed.)

To substantially eliminate formation of unwanted crystal structures (caused by spurious nucleation, dendritic growth, anomalous non-fibrous growth or cancers, and molecular clumps) within the fibrous (needle) crystal growth on the surface of screen support 25, the condensation temperature is distributed uniformly over the surface of screen support 25, and all direct paths of travel of CsI and TlI gas to the support 25 are blocked by disc 17 and baffles 29. Positioned in oven 21 as shown in FIG. 3, disc 17 and baffles 29 block all direct paths of the CsI and TlI gas molecules as they travel toward screen support 25, causing the molecules to repeatedly hit the disc 17 and baffles 29, thereby separating molecules that may be clumped together and separating impurities from the molecules before the molecules reach and grow upon the surface of screen support 25. Also, it has been found that "upside-down evaporation" (i.e., the orientation of the CsI charge so that it faces the bottom of oven 21 and faces away from screen support 25) substantially reduces dendrite formation or frost on the CsI charge during evaporation and, hence, reduces the likelihood of formation of unwanted crystal structures on screen support 25.

Figure 5:
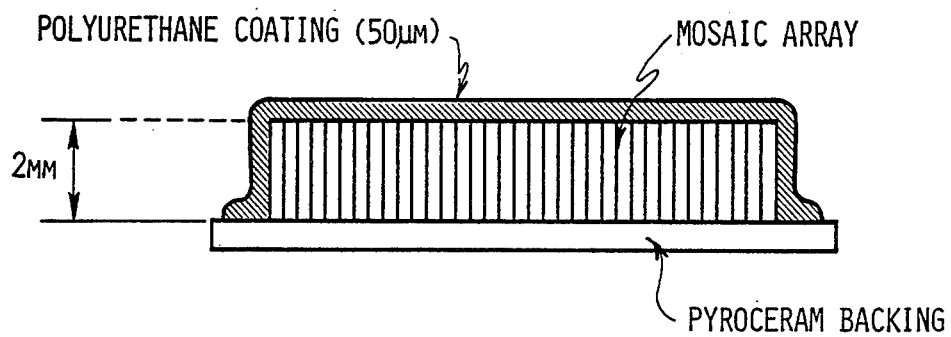
FIG. 5 is a sectional side view of a fiber optic thick screen which includes the scintillator produced in accordance with the present inventive method.

Screen support 25, with the CsI (Tl) fibers, is then removed from oven 21 and from the graphite heater block assembly 31, and a protective coating (e.g., polyurethane) is added to it to form a fiber optic X-ray intensification screen having a thickness of 2mm, as shown in FIG. 5.

Figure 6:
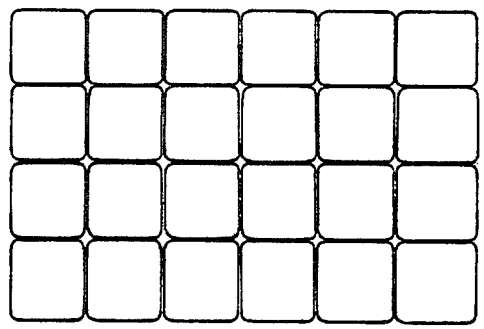
FIG. 6 is a graphic illustration of the ends of the fibers of the scintillator produced in accordance with the present inventive method, the ends representing a mosiac of light pipes.

The ends of the fibers, as shown in FIG. 6, represent a mosaic of facets (faces) of single-crystal optical fibers (light pipes), the diameter of each being sufficiently small to enable a number of the fibers to record each (capture and propagate photons representing) single item of information, thereby providing good image resolution. The mosaicly arranged fibers also serve to reduce diffusion, and hence, to improve image resolution by channeling the light photons produced during scintillation. Also, because of the length of the fibers, a faster "speed" is provided, i.e., a greater number of X-ray photon-stopping, absorption and conversion occurs than with prior art screens, resulting in lower patient dosages becoming sufficient to produce good quality images.

Furthermore, when the fiber optic screen of the present invention is used under ambient conditions, the CsI (Tl) scintillative properties remain stable, and do not decay.

Figure 7:
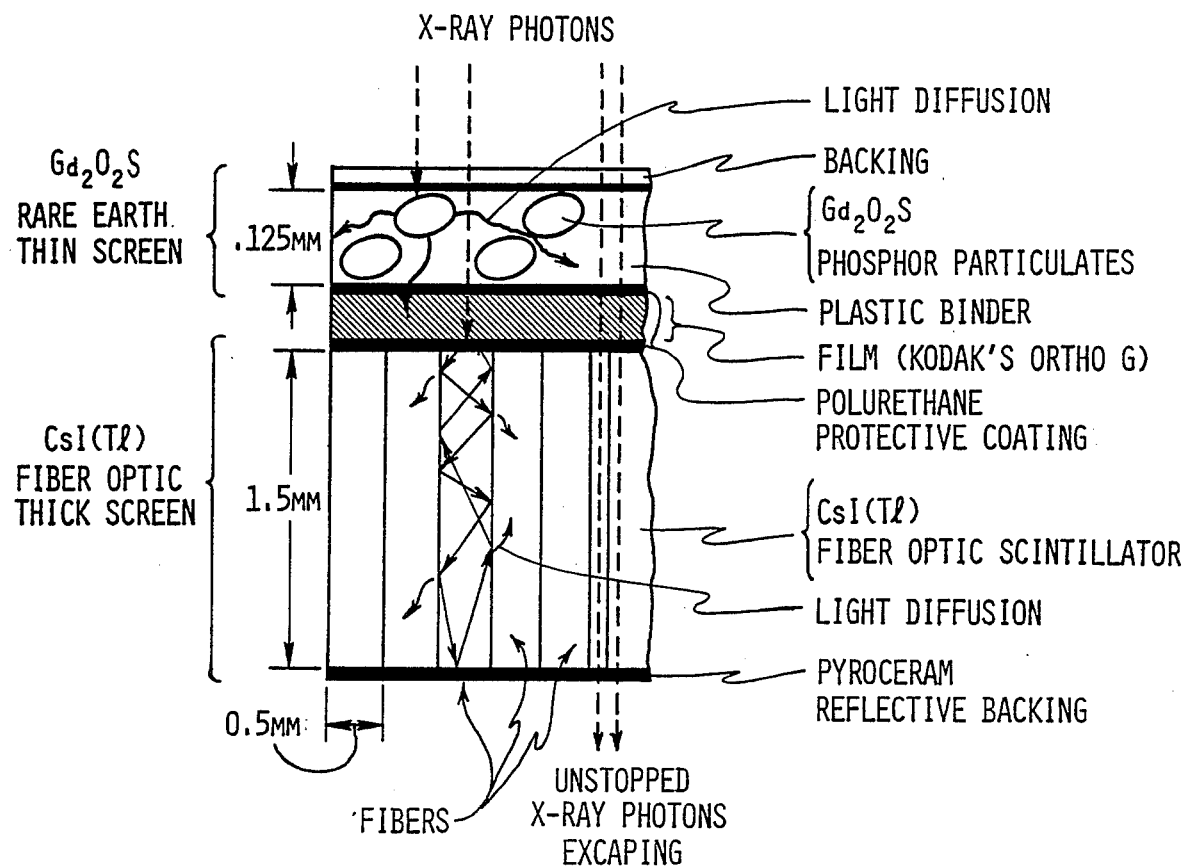
FIG. 7 is a sectional view of a thin-thick screen pair, the thick screen including the scintillator produced in accordance with the present inventive method.

To achieve both good information capture (i.e., good stopping, absorption and conversion of information-carrying X-ray photons) and good image resolution, using a low patient dosage, a composite screen pair comprising a conventional rare earth thin screen and a CsI (Tl) thick screen of the present invention as shown in FIG. 7, is used. The composite screen pair provides for a significant reduction in patient dose from 20 milliroentgens (when the X-ray source is operating at a 100 kilovolts peak) to 2 milliroentgens (when the X-ray source is operating at a high voltage level of 350 kilovolts peak). High voltage systems, for example, high voltage chest X-ray systems, have considerable diagnostic advantage over lower voltage systems which operate in the 90–150 peak kilovolt range. However, conventional screens are less able to stop the higher energy X-ray photons produced by high voltage sources than the thick fiber-optic screen of the present invention. Compared to the quantum efficiency or X-ray photon-stopping efficiency of approximately 45% for a 1.5mm thick fiber-optic screen of the present invention, a conventional thick screen is capable of achieving a quantum efficiency no more than 18%.

Figure 8:
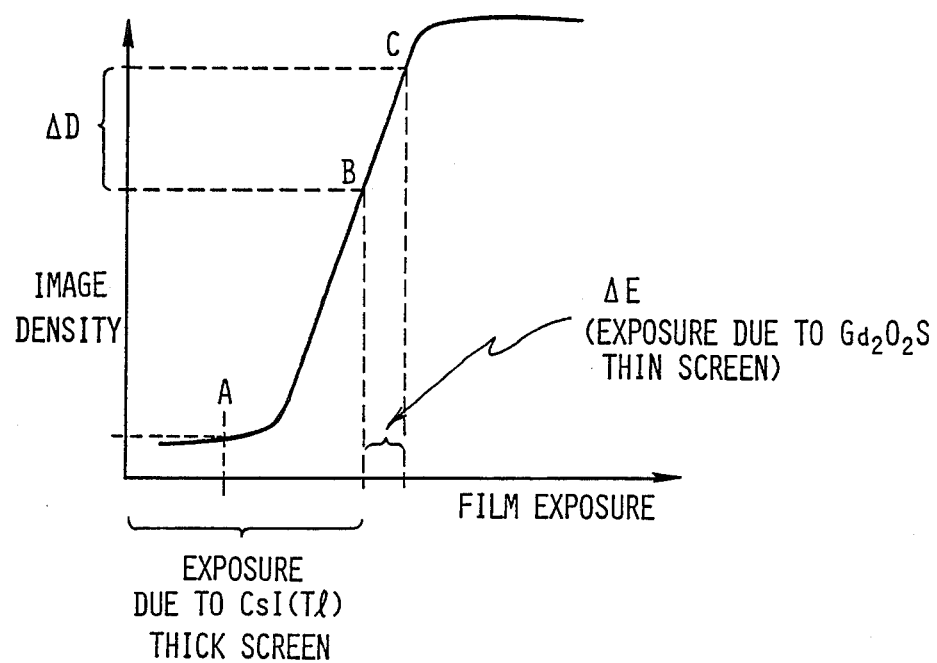
FIG. 8 is a graphic illustration of the effect of the thin and thick screens of FIG. 7 upon film exposure and image density or resolution.

When the composite screen pair shown in FIG. 7 is used, the rare earth $Gd_2O_2S$ (Gadolinium Oxy-Sulphide) thin screen receives X-ray photons from the object under investigation, and stops and converts to visible light about 9% of the received X-ray photons. About 40% of this visible light escapes the thin screen and exposes the film, and about 60% becomes diffused. Of the X-ray photons which are not stopped by the $Gd_2O_2S$ thin screen, about 43% are stopped and converted to visible light by the CsI (Tl) fiber-optic thick screen. Although some of the visible light becomes diffused through the walls and faces (ends) of the fibers, a significant percentage of the visible light is channeled in the fibers and reflected from the pyroceram reflective backing to expose the film. Some of this light from the fibers that are not absorbed initially by the film is reflected by the thin screen back toward the film, exposing the film. Thus, about 44% of applied X-ray photons, and about 75% of the light spectrum produced by the CsI (Tl) screen are utilized by the composite screen pair to produce an X-ray image. The light from the CsI (Tl) fiber-optic thick screen, in effect, biases the X-ray film (at point B as shown in FIG. 8) such that the relatively small amount of exposure ($\Delta E$) caused by visible light from the $Gd_2O_2S$ thin screen produces a comparatively large increase ($\Delta D$) in image density (contrast), thereby significantly improving image resolution. The composite screen pair of FIG. 7 thus provides high resolution (up to 5 line pairs/mm) images, while requiring lower patient dosages (e.g., a patient dosage as low as 2 milliroentgens in response to X-rays from a 350 kilovolt source).

FIG. 7 also shows the use of Kodak's Ortho G film with the composite screen pair. This film is most sensitive to light of 5400A wave length. For a film which more closely matches the spectral output of the CsI (Tl) thick screen (e.g., a film which is most sensitive to a wave length of 5700A), at least a 100% improvement in speed, with no loss in resolution can be expected using the composite screen pair of the present invention.

An alternative method of producing the fiber-optic thick screen of the present invention includes the steps of first evaporating and depositing CsI on the reflective screen support (backing), then evaporating and depositing TlI on the previously deposited CsI.

Also, in addition to the dopant (e.g., TlI), metals such as lead tin, or manganese can be added, i.e., co-evaporated with the CsI and TlI, to produce light attenuation in the CsI (Tl) phosphor and absorb diffused light photons, thereby improving image resolution.

We claim:

1. A method of producing a fiber-optic scintillator that is stable under ambient conditions, the method comprising the steps of:
    evaporating a first material;
    evaporating a second material; and
    vacuum depositing the evaporated materials onto a selected backing material to produce a scintillator having uniformly shaped optical fibers that are stable under ambient conditions.

2. The method of claim 1 where the first material is vacuum-deposited cesium iodide and the step of evaporating this first material includes the steps of:
    placing solid cesium iodide in a container;
    vacuum depositing the cesium iodide onto a selected member; and
    heating the deposited cesium iodide to a first selected temperature to produce cesium iodide vapor.

3. The method of claim 2 where the container has a porous bottom and the step of vacuum depositing includes the steps of:

heating the solid cesium iodide in the container to a second selected temperature until the cesium iodide melts and filters through and accumulates on the outside of the bottom of the container;

maintaining the member at a selected first coolest temperature; and evacuating an area between the bottom of the container and the member, causing the accumulated cesium iodide to evaporate and deposit on the member.

4. The method of claim 2 where the step of heating includes the step of outgasing the deposited cesium iodide at a selected temperature lower than the first selected temperature to remove gaseous impurities from the deposited cesium iodide.

5. The method of claim 1 where the second material is solid thallium iodide and the step of evaporating this material includes the steps of:

placing the solid thallium iodide in a container with an orifice;

evacuating a selected area external to the container; and heating the solid thallium iodide to a third selected temperature to produce thallium iodide vapor.

6. The method of claim 5 where the method includes the step of mixing the evaporated first and second materials in selected amounts by leakage of the evaporated second material through the container's orifice.

7. The method of claim 5 where the step of heating includes the step of outgasing the solid thallium iodide at a selected temperature lower than the third selected temperature to remove gaseous impurities from the thallium iodide.

8. The method of claim 1 where the step of depositing includes the step of maintaining the backing material at a selected second coolest temperature, permitting the mixed evaporated materials to deposit uniformly onto the backing material.

9. The method of claim 1 where the method includes the step of co-evaporating with the first and second materials a selected metal for improving image resolution.

10. A fiber-optic scintillator, vacuum deposited on a backing material, the scintillator comprising:

a first selected material; and a second selected material, the first and second materials being evaporated and vacuum deposited onto the backing material, forming a scintillator thereon having uniformly-shaped optical fibers that are stable under ambient conditions.

11. The fiber optic scintillator of claim 10 wherein the first selected material is cesium iodide, the second selected material is thallium iodide, and the scintillator is a thallium doped cesium iodide scintillator.

12. The fiber optic scintillator of claim 10 wherein the scintillator includes a metallic material co-evaporated and vacuum deposited with the first and second materials for improving image resolution.

13. An X-ray screen pair comprising:

a thin screen having a first selected particulate scintillative material; and a fiber optic thick screen having a second selected scintillative material which is stable under ambient conditions, the fiber optic thick screen being coupled to the thin screen for receiving a film therebetween.

14. The X-ray screen pair of claim 13 wherein the second scintillative material is a thallium doped cesium iodide scintillator formed by evaporating and vacuum depositing thallium doped cesium iodide onto a selected backing material.

15. The X-ray screen pair of claim 13 wherein the first scintillative material is a high-resolution gadolinium oxysulphide rare-earth material.

16. The X-ray screen pair of claim 14 wherein the second scintillative material includes a metallic material co-evaporated and vacuum deposited with the thallium doped cesium iodide material for improving image resolution.

* * * * *